United States Patent
Vass

(10) Patent No.: US 8,285,886 B1
(45) Date of Patent: Oct. 9, 2012

(54) LIVE MEDIA PLAYBACK ADAPTIVE BUFFER CONTROL

(75) Inventor: Jozsef Vass, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 116 days.

(21) Appl. No.: 12/871,787

(22) Filed: Aug. 30, 2010

(51) Int. Cl.
*G06F 3/00* (2006.01)
*G06F 13/00* (2006.01)

(52) U.S. Cl. .......... 710/15; 710/2; 710/5; 710/8; 710/33
(58) Field of Classification Search .................. None
See application file for complete search history.

(56) References Cited

U.S. PATENT DOCUMENTS

| | | | |
|---|---|---|---|
| 7,412,004 B2 | 8/2008 | Faller | |
| 2008/0008281 A1* | 1/2008 | Abrol et al. | 375/359 |
| 2009/0204842 A1* | 8/2009 | Tetik et al. | 713/400 |

OTHER PUBLICATIONS 5.1 Channel Production Guildelines, 2000, Dolby Laboratories Inc., [online, accessed on Feb. 11, 2011], URL: http://www.dolby.com/uploadedFiles/zz-_Shared_Assets/English_PDFs/Professional/L.mn.0002.5.1guide.pdf.*

* cited by examiner

*Primary Examiner* — Scott Sun
(74) *Attorney, Agent, or Firm* — Fish & Richardson P.C.

(57) ABSTRACT

Methods, systems, and apparatus, including computer programs encoded on a computer storage medium, are described for live media playback adaptive buffer control. For example, when media accumulated in the live buffer exceeds a user-configured threshold, media can be played out faster. In this manner, the media player is configured not to discard media packets, but rather to render the buffered media faster to slowly eliminate accumulated backlog. Preventing unbounded buffer accumulation may be desirable in applications like video surveillance, live video broadcast, webcast, and the like.

19 Claims, 6 Drawing Sheets

LIVE MEDIA PLAYBACK ADAPTIVE BUFFER CONTROL

BACKGROUND

This specification relates to live media playback adaptive buffer control.

Media players can be operated on client computers to playback live media in buffered and un-buffered mode. Un-buffered mode can be used in real-time collaboration applications, when it is desired to keep end-to end delay to a minimum. Live buffered mode can be used in non-time-critical live streaming applications, such as broadcast, webcast, surveillance, etc. In live buffered mode, media can be delivered to a client computer system from a media streaming server system through communication channels based on Real-Time Messaging Protocol (RTMP), Real-Time Streaming Protocol (RTSP), Hypertext Transfer Protocol (HTTP), and the like.

Possible causes of buffer accumulation can be network congestion or server overload, i.e., the media delivered by the media streaming server system may not be received for a few seconds by a media player running on the client computer system. The delivered media, however, is not lost; it is delivered as a burst as soon as the computational resources become available. Further, clock drift between an encoder (at the media streaming server system) and a decoder (at the client computer system) can result in different media production and consumption rates. Although the clock drift can be quite small, it can accumulate over time. Therefore, the media player is configured to maintain a few seconds of media buffer to compensate for media delivery and clock drift issues.

SUMMARY

The systems and techniques disclosed in this specification enable configurable live buffer control. For example, when media accumulated in the live buffer exceeds a user-configured threshold, media can be played out faster. In this manner, the media player is configured not to discard media packets, but rather to render the buffered media faster to slowly eliminate accumulated backlog. Preventing unbounded buffer accumulation may be desirable in applications like video surveillance, live video broadcast, webcast, and the like. In these applications, live media can be streamed with usually a few seconds of buffer. The buffered media can be used to compensate for network interruptions, server overload, client clock drift, and the like.

In general, one innovative aspect of the subject matter described in this specification can be implemented in methods that include the actions of receiving a media stream in a buffer. The received media stream contains media messages such that each media message includes media content corresponding to (i) a timed-sequence of video frames and (ii) audio channels that are synchronized with the timed-sequence of video frames. Each decompressed/decoded audio channel includes a number of channel-specific samples that are separated in time within each channel and are synchronized across the audio channels. The methods further include decoding a media message from the buffer to obtain a decoded portion of the received media stream including a corresponding timed sequence of video frames and corresponding audio channels. Responsive to a size of the buffer being less than or equal to a predetermined size, the methods include playing the decoded portion of the received media stream. Responsive to the size of the buffer being more than the predetermined size, the methods include combining the audio channels corresponding to the decoded portion of the received media stream in a combined signal having the number of samples of the audio channels. The methods further include analyzing in time domain the combined signal to determine a reduced number of samples to obtain down-sampled audio channels corresponding to the respective audio channels, such that each down-sampled audio channel include the reduced number of samples. Furthermore, the methods include generating, based on the analyzing, a modified portion of the media stream that includes the timed-sequence of video frames corresponding to the decoded portion of the received media stream and the down-sampled audio channels. The methods also include playing the modified portion of the media stream. While playing the decoded portion of the received media stream or the modified media stream, the methods include decoding a next media message from the buffer to obtain a decoded next portion of the received media stream. Additionally, the methods include processing the decoded next portion of the received media stream responsive to the size of the buffer relative to the predetermined size.

These and other implementations can include one or more of the following features. In some implementations, the audio channels can include a left audio channel and a right audio channel corresponding to a stereo sound mix. In some implementations, the audio channels include six audio channels corresponding to a 5.1 sound mix. Combining the audio channels corresponding to the decoded portion of the received media stream into the combined signal can include summing the audio channels. Analyzing in the time domain can include determining a time offset of the combined signal and a given number of samples to be removed from the combined signal starting at the determined time offset. Determining the given number of samples to be removed from the combined signal starting at the determined time offset can include selecting the given number of samples to be removed based on a difference between the size of the buffer and the predetermined time.

In some implementations, the methods can include combining the audio channels corresponding to the decoded portion of the received media stream in one or more difference signals that can include corresponding difference samples. Each of the one or more difference signals can have the number of samples of the audio channels. In addition, generating based on the analyzing can include removing the given number of samples from the combined signal to obtain a down-sampled sum signal that includes the reduced number of samples. Further, generating can include removing the given number of samples from each of the one or more difference signals starting at the determined time offset to obtain respective one or more down-sampled difference signals such that each down-sampled difference signal includes the reduced number of samples. Furthermore, generating can include obtaining the down-sampled audio channels using linear combinations of the down-sampled sum signal and the one or more down-sampled difference signals. The one or more differences signals represent pair-wise differences of audio channels.

According to another aspect, the described subject matter can also be implemented in a system including memory configured to store a live buffer. The system also includes one or more processors communicatively coupled with the memory. The one or more processors are configured to perform operations including receiving a media stream in the live buffer. The received media stream includes media messages, such that each media message contains media content including (i) a timed-sequence of video frames and (ii) audio channels that are synchronized with the timed-sequence of video frames.

Each decompressed/decoded audio channel includes a number of channel-specific samples that are separated in time within each channel and are synchronized across the audio channels. The one or more processors are also configured to perform operations including decoding a media message from the live buffer to obtain a decoded portion of the received media stream including a corresponding timed sequence of video frames and corresponding audio channels. The one or more processors are configured to perform, responsive to a buffer length of the live buffer being less than or equal to a predetermined length, operations including playing the decoded portion of the received media stream. The one or more processors are configured to perform, responsive to the buffer length being more than the predetermined length, operations including summing the audio channels corresponding to the decoded portion of the received media stream in a sum signal having the number of samples of the audio channels. Further, the one or more processors are configured to perform operations including analyzing in time domain the sum signal to determine a reduced number of samples to obtain down-sampled audio channels corresponding to the respective audio channels, such that each down-sampled audio channel to includes the reduced number of samples. Furthermore, the one or more processors are configured to perform operations including generating, based on the analysis, a modified portion of the media stream that includes the timed-sequence of video frames corresponding to the decoded portion of the received media stream and the down-sampled audio channels. Additionally, the one or more processors are configured to perform operations including playing the modified portion of the media stream. The one or more processors are configured to perform, while playing the decoded portion of the received media stream or the modified media stream, operations including decoding a next media message from the buffer to obtain a decoded next portion of the received media stream. In addition, the one or more processors are configured to perform operations including processing the decoded next portion of the received media stream responsive to the length of the buffer relative to the predetermined length.

These and other implementations can include one or more of the following features. To carry out said summing the audio channels corresponding to the decoded portion of the received media stream into the sum signal, the one or more processors are configured to perform operations including performing a weighted sum of the audio channels. To carry out said analyzing in the time domain, the one or more processors are configured to perform operations including determining a time offset of the sum signal and a given number of samples to be removed from the sum signal starting at the determined time offset. The one or more processors can be configured to perform operations including combining the audio channels corresponding to the decoded portion of the received media stream in one or more difference signals that include corresponding difference samples, such that each of the one or more difference signals has the number of samples of the audio channels. To carry out said generating based on the analyzing, the one or more processors are configured to perform operations including removing the given number of samples from the sum signal to obtain a down-sampled sum signal that includes the reduced number of samples; removing the given number of samples from each of the one or more difference signals starting at the determined time offset to obtain respective one or more down-sampled difference signals such that each down-sampled difference signal includes the reduced number of samples; and obtaining the down-sampled audio channels using linear combinations of the down-sampled sum signal and the one or more down-sampled difference signals. The one or more difference signals can be pair-wise differences of audio channels.

According to another aspect, the described subject matter can also be implemented in a computer storage medium encoded with a computer program, the program including instructions that when executed by data processing apparatus cause the data processing apparatus to perform operations including receiving a video stream in a buffer. The received video stream includes messages, such that each video message contains media content including (i) a timed-sequence of video frames and (ii) audio channels that are synchronized with the timed-sequence of video frames. Each decoded/decompressed audio channel includes a number of channel-specific samples that are separated in time within each channel and are synchronized across the audio channels. The program further includes instructions that when executed by data processing apparatus cause the data processing apparatus to perform operations including decoding a video message from the buffer to obtain a decoded portion of the received video stream including a corresponding timed sequence of video frames and corresponding audio channels. Responsive to a length of the buffer being less than or equal to a predetermined length, the program includes instructions that when executed by data processing apparatus cause the data processing apparatus to perform operations including playing the decoded portion of the received video stream. The program includes instructions that when executed by data processing apparatus cause the data processing apparatus to perform, responsive to the length of the buffer being more than the predetermined length, operations including mixing the audio channels corresponding to the decoded portion of the received video stream in a sum signal having the number of samples of the audio channels; analyzing in time domain the sum signal to determine a reduced number of samples to obtain down-sampled audio channels corresponding to the respective audio channels, such that each down-sampled audio channel to include the reduced number of samples; generating based on the analyzing a modified portion of the video stream that includes the timed-sequence of video frames corresponding to the decoded portion of the received video stream and the down-sampled audio channels; and playing the modified portion of the video stream. The program includes instructions that when executed by data processing apparatus cause the data processing apparatus to perform, while playing the decoded portion of the received video stream or the modified video stream, operations including decoding a next video message from the buffer to obtain a decoded next portion of the received video stream. Additionally, the program further includes instructions that when executed by data processing apparatus cause the data processing apparatus to perform operations including processing the decoded next portion of the received video stream responsive to the length of the buffer relative to the predetermined length.

Particular embodiments of the subject matter described in this specification can be implemented so as to realize one or more of the following advantages. Mixing the audio channels corresponding to the decoded portion of the received video stream into the sum signal can include performing a weighted sum of the audio channels. Analyzing in the time domain can include determining a time offset of the sum signal and a given number of samples to be removed from the sum signal starting at the determined time offset. Further, the program further includes instructions that when executed by data processing apparatus cause the data processing apparatus to perform operations including combining the audio channels corresponding to the decoded portion of the received video stream in one or more difference signals that include corresponding difference samples, such that each of the one or more difference signals can have the number of samples of the audio channels. Generating based on the analyzing includes removing the given number of samples from the sum signal to obtain a down-sampled sum signal that includes the reduced number of samples; removing the given number of samples from each of the one or more difference signals starting at the determined time offset to obtain respective one or more down-sampled difference signals such that each down-sampled difference signal includes the reduced number of samples; and obtaining the down-sampled audio channels using linear combinations of the down-sampled sum signal and the one or more down-sampled difference signals. In some implementations, the one or more differences signals can be pair-wise differences of audio channels.

Particular implementations of the subject matter described in this specification can be configured so as to realize one or more of the following advantages. For example, if media is accumulating in a live buffer beyond a pre-defined buffer size, a media player can be configured to re-subscribe to the media stream. Re-subscribing to the media stream can lead to data loss and media playback interruptions. The systems and techniques disclosed in this specification can avoid undesirable data loss and playback discontinuities that might otherwise be caused by re-buffering.

Additionally, the systems and techniques disclosed in this specification can potentially maintain precise control of the buffer size, while the audio and video components of the media stream remain in synchronization. In addition, the disclosed techniques can be used to play media streams having high quality multi-channel (e.g., stereo) sound. Moreover, the audio channels can have any one of multiple audio sampling rates. Further, the techniques described in this specification introduce distortion that may be unnoticeable by an average audience. For example, no noticeable loss/jump in media can be perceived by an average viewer. While achieving the foregoing benefits, the disclosed techniques are characterized by low computational complexity since they are performed in time domain. Accordingly, the technology described in this specification can be implemented on devices for which computational and power resources are at a premium, such as mobile electronic devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
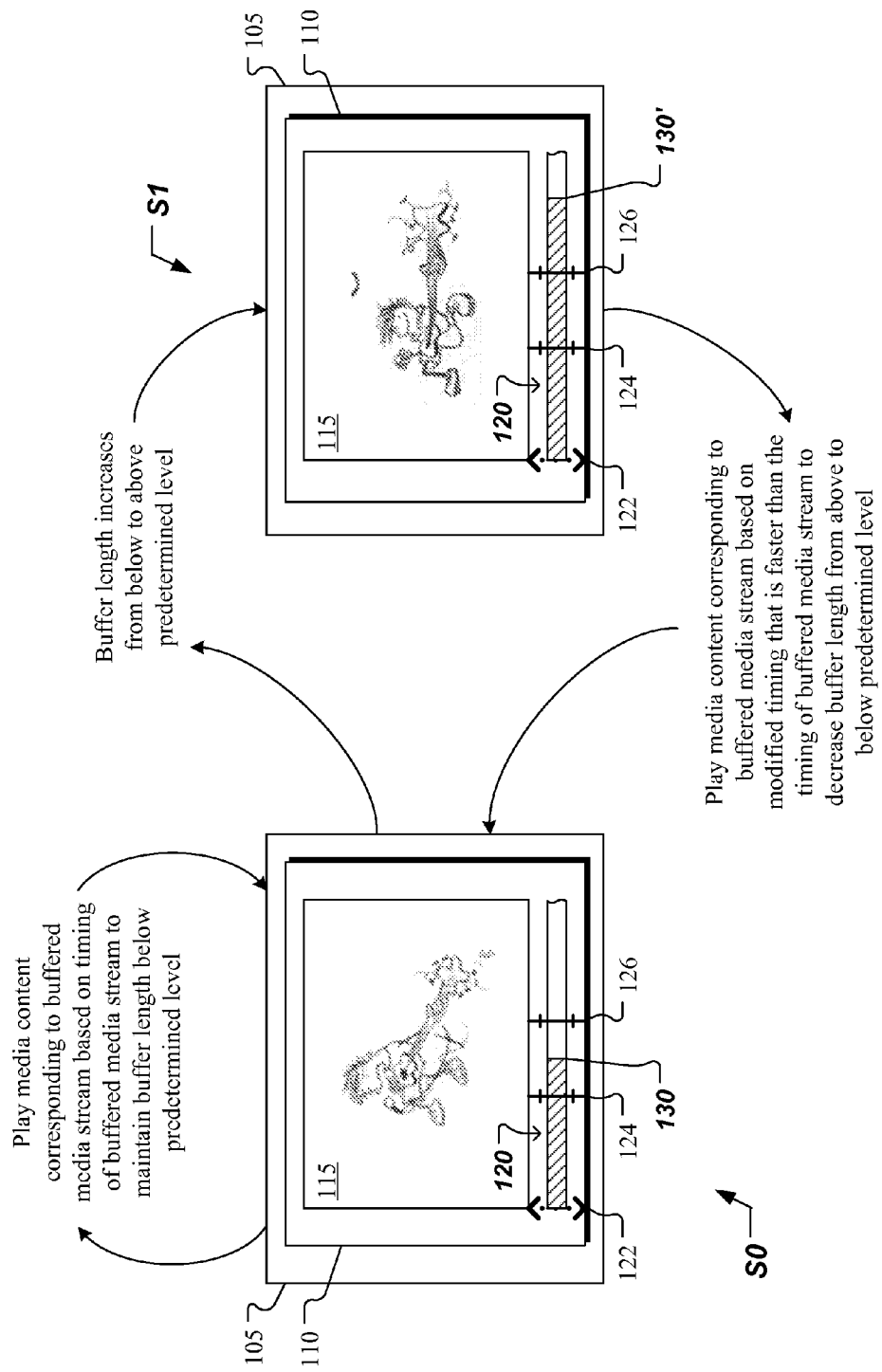
FIG. 1 shows an example of a procedure for adaptively controlling a buffer size of a media player.

FIG. 1 shows an example of a procedure for adaptively controlling a buffer size of a media player. A client system 105 includes a media player 110 for rendering and playing a media stream received from a media streaming server system. In this specification, the client system is also referred to, interchangeably, as a data processing apparatus 105. A content publishing window 115 of the media player 110 presents to a user associated with the client system 105 contents of the received media stream during playback.

A live buffer 120 is a first-in-first-out (FIFO) queue of the media player 110 and can be used to compensate for network transmission disruptions, media streaming server overload, clock drift between sender (e.g., the media streaming server system) and receiver (e.g., the client system 105), and computing resource shortages (e.g., spikes in usage of the client system 105's central processing unit (CPU), etc.) A portion of the media stream that has been received by the client system 105 and has been buffered (but not yet played) by the media player 110 is represented diagrammatically by a back-slash band succeeding a first time offset 122 associated with the live buffer 120. The first time offset 122 is represented by a vertical dotted-line ending in arrows. The content publishing window 115 of the media player 110 presents to the user associated with the client system 105 media content corresponding to a portion of the buffered media stream preceding the first time offset 122.

The media stream in the live buffer 120 includes media messages. Each media message includes a timed-sequence of video frames and can include audio channels that are synchronized with each other and with the timed-sequence of video frames. In some implementations, the audio channels include a left audio channel and a right audio channel corresponding to a stereo sound arrangement. In some implementations, the audio channels include six audio channels corresponding to a 5.1 sound arrangement. Live buffered applications are often related to receiving and playing-back high quality content 115 (such as broadcast of concerts, as illustrated in FIG. 1, sporting events, and the like) and thus, it is important to minimize negative audience experiences. Accordingly even when there is need to reduce end-to-end delay, in such live buffered applications it is desired to render all audio and video messages included in the buffered media stream rather than to drop entire media messages.

A buffer length 130 represents a current size of the buffered portion of the media stream. The size of the buffered portion of the media stream can fluctuate for the reasons enumerated above. Sometimes the buffer length 130 can accumulate beyond desirable levels. To quantify such desirable levels, a desired buffer size 124, and a maximum buffer size 126 can be specified. The equivalent time offsets corresponding to the specified buffer size 124 and to the specified maximum buffer size 126 are represented by vertical lines with horizontal bars. Accordingly, a difference between the specified maximum buffer size 126 and the specified buffer size 124 represents a specified (acceptable) range of buffer overrun. In addition, a relative size of the buffered portion of the media stream can be measured in terms buffer excess defined as a difference between the buffer length 130 and the specified maximum buffer size 126.

A state S0 of the live buffer 120 can be characterized by a buffer length 130 below a predetermined level. For example, the live buffer 120 is considered to be in the state S0 if the buffer length 130 is at least less than the specified maximum buffer size 126. In this case, the buffer length 130 can be more than the specified buffer size 124. Equivalently, the live buffer 120 is in the state S0 if the buffer excess is negative. While the live buffer 120 is in state S0, the media player 110 is configured to play media content 115 corresponding to the buffered media stream based on timing of the buffered media stream. By doing so, the buffer length 130 can be maintained below the specified maximum buffer size 126, and the live buffer 120 can remain in state S0, as long as the media player 110 plays/consumes at least as much buffered media as it receives from the media streaming server.

However, the live buffer 120 transitions from the state S0 to another state S1 when the buffer length 130' increases from below the predetermined level to above it. For example, the live buffer 120 is considered to be in the state S1 if the buffer length 130' is more than the specified maximum buffer size 126. Equivalently, the live buffer 120 is in the state S1 if the buffer excess is positive. This transition from state S0 to state S1 can occur when the media player 110 plays/consumes less buffered media then it receives from the media streaming server. Once the live buffer 120 is in state S1, the media player 110 is configured to perform a catch-up process to lower the buffer length 130' from above to below the predetermined level. A rate of the catch-up process can be proportional to the buffer excess as described below in connection with FIG. 4A. In general, the media player 110 is configured to play media content 115 corresponding to the buffered media stream based on a modified timing that is faster that the timing of the buffered media stream. As a result of such a catch-up process, the live buffer 120 transitions from the state S1 back into the state S0, once the buffer length 130 reaches a level below the specified maximum buffer size 126.

The media player 110 can be configured to calculate the buffer length 130 as a timestamp difference between first and last messages in the live buffer queue 120. Since incoming media data is inherently bursty (because the sequence of video frames includes key and predicted frames, because network jitter, and the like,) a moving average of the buffer length 130 can be used to determine whether catch-up is needed (and subsequently what the catch-up rate should be).

Figure 2:
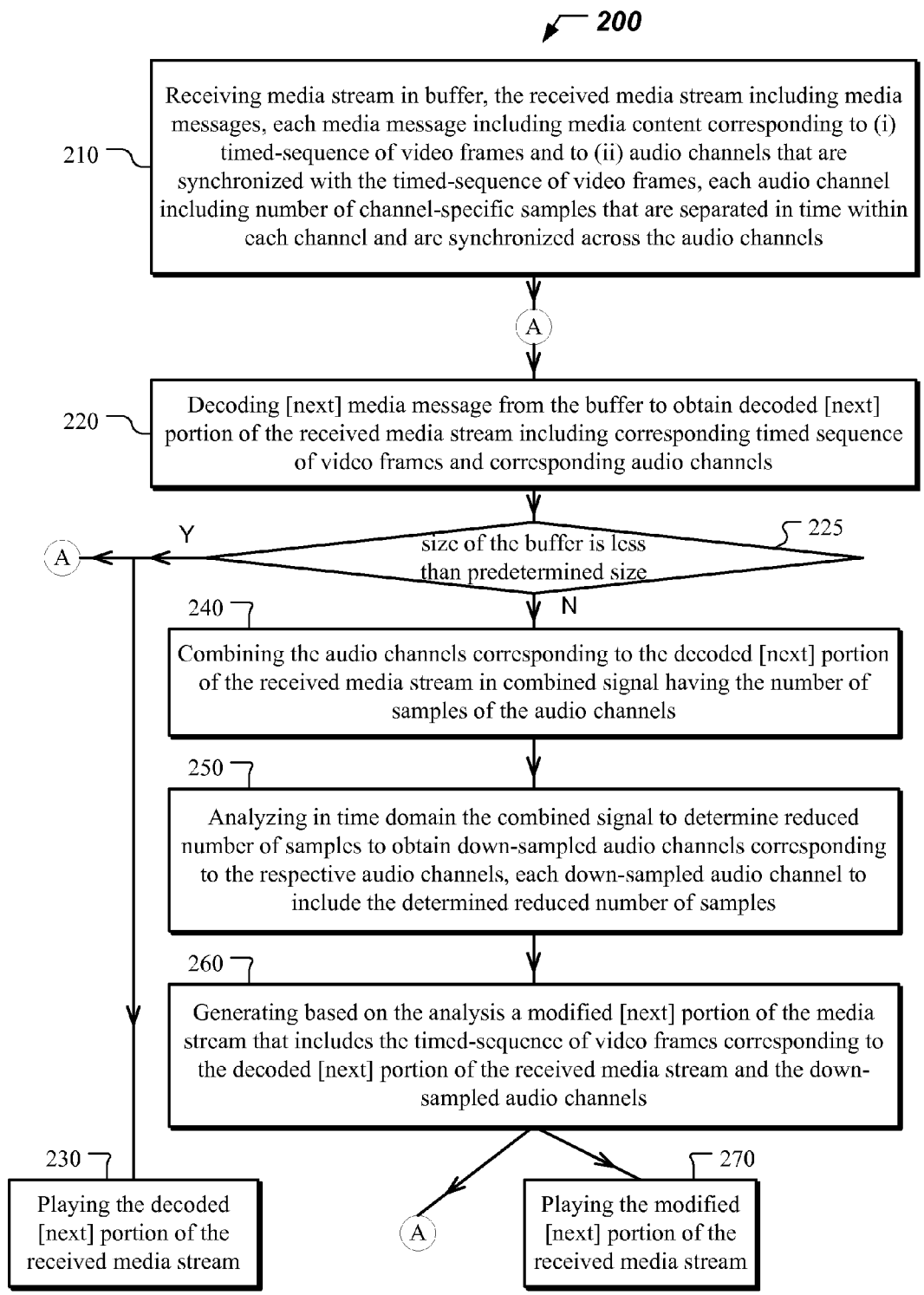
FIG. 2 shows an example of a method for managing a buffer size during playback of a media stream including video and audio messages.

FIG. 2 is an example of a method 200 for managing a buffer size during playback of a media stream including video and audio messages. In some implementations, the method 200 can be performed by the data processing apparatus 105 and can be implemented as part of the media player 110 illustrated in FIG. 1.

The method 200 includes receiving 210 a media stream in a buffer. The received media stream includes media messages. Each media message includes media content corresponding to a timed-sequence of video frames and to audio channels that are synchronized with the timed-sequence of video frames. For example, a media message of the media stream can contain 20-50 ms of compressed audio data. Each decompressed/decoded audio channel includes a specific-number of samples that are separated in time within each channel and are synchronized across the audio channels. In some implementations, the audio channels include a left audio channel and a right audio channel corresponding to a stereo sound mix. In some implementations, the audio channels include six audio channels corresponding to a 5.1 sound mix.

Further, the method 200 includes decoding 220 a media message from the buffer to obtain a decoded portion of the received media stream including corresponding timed sequence of video frames and corresponding audio channels. For example, the data processing apparatus that carries out the method 200 can select for decoding 220 a message of the buffered media following a currently playing message.

Furthermore, the data processing apparatus can be configured to monitor a size of the buffer. As described above, the buffer size can be monitored as a running average over a predetermined number of buffer reads. Responsive to the size of the buffer being less than or equal to a predetermined size at 225, the method 200 includes playing 230 the decoded portion of the received media stream. Additionally, the method 200 includes decoding 220 a next media message from the buffer to obtain a decoded next portion of the received media stream. The decoding 220 of the next media message is carried out by the data processing apparatus, as a parallel process, while playing 230 the decoded portion of the received media stream.

Responsive to the size of the buffer being more than the predetermined size at 225, the data processing apparatus can be configured to determine a catch-up rate for playing the decoded portion of the received media stream. Since the technologies disclosed in this specification are directed to processing high quality media streams, the method 200 can be applied to audio channels corresponding to stereo sound up to 44.1 kHz. Multiple audio catch-up techniques configured to operate in time-domain can be used to down-sample the decoded audio channels. For example, every $n^{th}$ sample of an audio channel can be discarded through a decimation process to obtain down-sampled audio channels. The decimation technique, however, causes the audio pitch of the down-sampled audio channels to increase compared to the original audio channels, resulting in so-called Mickey-Mouse sound.

To avoid such unwanted distortions, the method 200 includes combining 240 the audio channels corresponding to the decoded portion of the received media stream in a combined signal having the same number of samples as the audio channels. As described below in connection with FIG. 3, the audio channels can be mixed in a combined signal representing the sum of the audio channels, and in one or more difference signals representing corresponding pair-wise differences of the audio signals. For example, when the audio channels include left and right stereo channels, the data processing apparatus is configured to prepare a sum signal and a difference signal from the left and right channels.

Furthermore, the method 200 includes analyzing 250 in time domain the combined signal to determine a reduced number of samples for obtaining down-sampled audio channels corresponding to the respective audio channels. Each of the obtained down-sampled audio channels includes the determined reduced number of samples. As described below in connection with FIGS. 4A-4B and 5, the data processing apparatus is configured to perform splicing and filtering of the combined signal. For example, the data processing apparatus can determine a splicing offset and can then splice a portion of the combined signal starting with the determined splicing offset. Subsequently, the splicing and filtering of the one or more difference signals can be performed by using the previously determined splicing offset.

In addition, the method 200 includes generating 260 a modified portion of the media stream that includes the timed-sequence of video frames corresponding to the decoded portion of the received media stream and the down-sampled audio channels based on the analyzing 250. For example, the left and right channels can be reconstructed as linear combinations of the down-sampled sum and difference signals.

The method 200 further includes playing 270 the modified portion of the media stream. The number of audio samples of the audio channels is reduced by splicing, and thus, the down-sampled audio channels can be played faster. A media player running on the data processing apparatus is configured to synchronize video to audio, therefore audio and video synchronization is maintained during accelerated play/consumption of the modified portion of the media stream. Additionally, the method 200 includes decoding 220 a next media message from the buffer to obtain a decoded next portion of the received media stream. The decoding 220 of the next media message is carried out, as a parallel process, while playing 270 the modified media stream. Moreover, the data processing apparatus is configured to process the decoded next portion of the received media stream in accordance with the method 200 based on a result of comparing 225 the buffer size relative to the predetermined size. The decoding 220, the comparing 225 and the appropriate subsequent aspects of method 200 can be executed in parallel with receiving 210 the media stream in the buffer, and further can be performed iteratively for all media messages received in the buffer.

Figure 3:
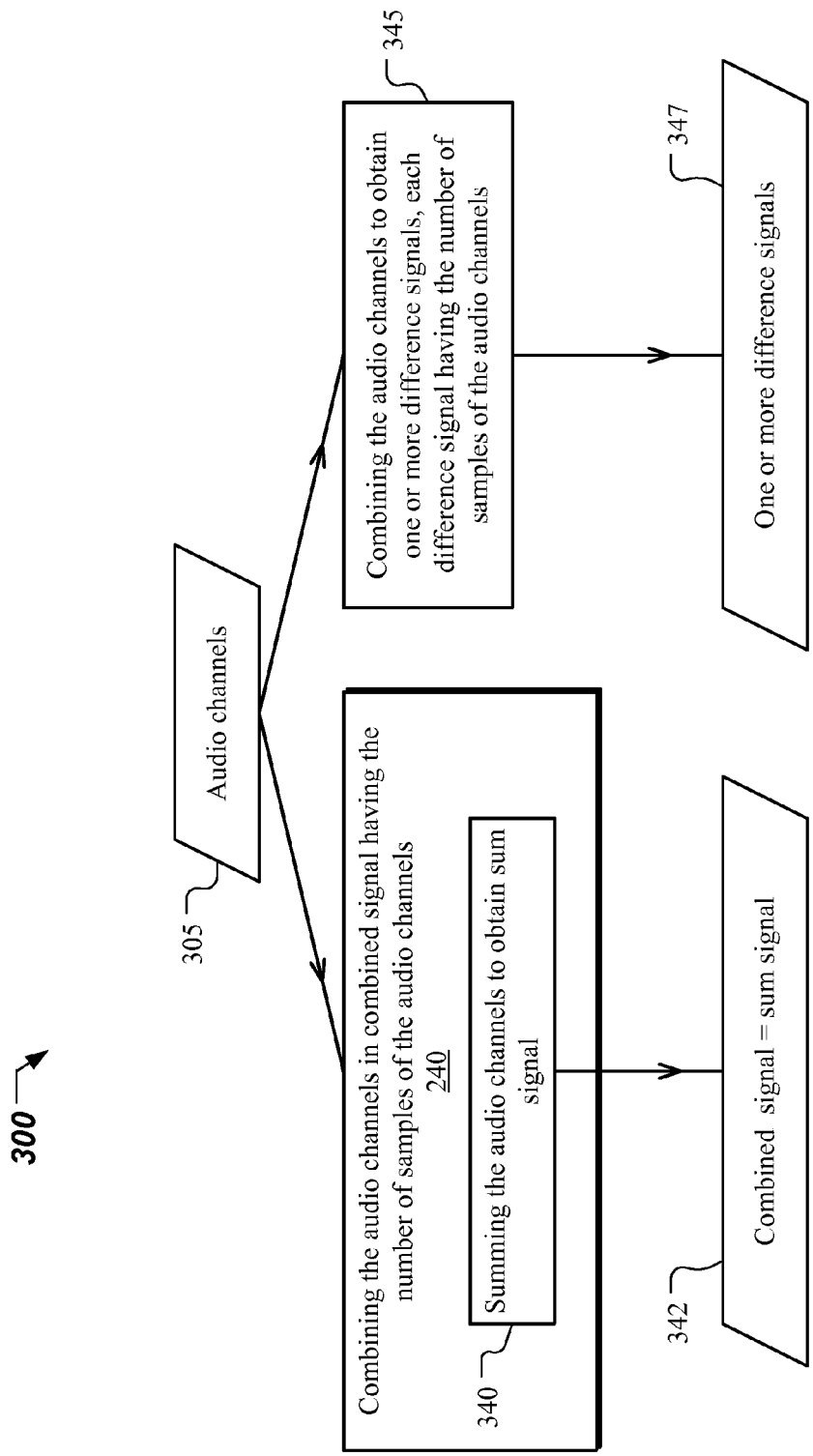
FIG. 3 shows an example of a method for combining audio channels corresponding to a message of a buffered media stream.

FIG. 3 is an example of a method 300 for combining audio channels corresponding to a message of a buffered media stream. In the example illustrated in FIG. 1, the method 300 can be performed by a data processing apparatus 105 and can be implemented as part of the media player 110. Moreover, method 300 can be used in conjunction with method 200 for combining 240 the audio channels into a combined signal.

The audio channels 305 correspond to one message of the buffered media stream decoded 220 in accordance with method 200. Accordingly, the audio channels 305 may be 20-30 ms long, and have approximately 1000 samples. For example, a channel that is about 23 ms long includes N=1024 samples. Splicing (i.e., removing a given number of samples from the N samples of each audio channel) the left and right audio channels independently can result in a phase shift between channels and may lead to echoing artifacts. The technologies described in this specification can potentially avoid the foregoing artifacts by splicing a combined signal (e.g., a stereo mix) and then obtaining down-sampled signals corresponding to the decoded channels based on the splicing of the combined signal.

In some implementations, combining 240 the audio channels 305 corresponding to the decoded portion of the received media stream into the combined signal 342 includes summing 340 the audio channels 305. The summing 340 of the audio channels 305 is performed by adding respective samples of the audio channels. In some implementations, summing 340 the audio channels 305 may include weighting the audio channels 305 prior to taking their sum. For example, the audio channels 305 can be weighted equally. If "l" represents the left channel (with l[i] being the $i^{th}$ sample of "l", i=1, 2, . . . , N,) and "r" represents the right channel (with r[i] being the $i^{th}$ sample of "r", i=1, 2, . . . , N), then the $i^{th}$ sample of the sum signal "s" can be determined as $s[i]=(l[i]+r[i])/2$.

As another example, the audio channels can be weighted unequally, based on weights proportional to respective roles/importance of the audio channels 305. In a 5.1 audio arrangement, the three channels corresponding to the front speakers can be weighted more than the two channels corresponding to the back speakers and the audio channel corresponding to the sub-speaker, for instance.

The method 300 also includes combining 345 the audio channels 305 corresponding to the decoded portion of the received media stream into one or more difference signals 347 that include corresponding difference samples. Each of the one or more difference signals 347 has a number of samples, N, equal to the number of samples of the audio channels. In some implementations, the one or more differences signals 347 represent pair-wise differences of audio channels. For example, for a stereo audio arrangement, the $i^{th}$-sample of the difference signal "d" can be determined as $d[i]=(l[i]-r[i])/2$.

Figure 4A:
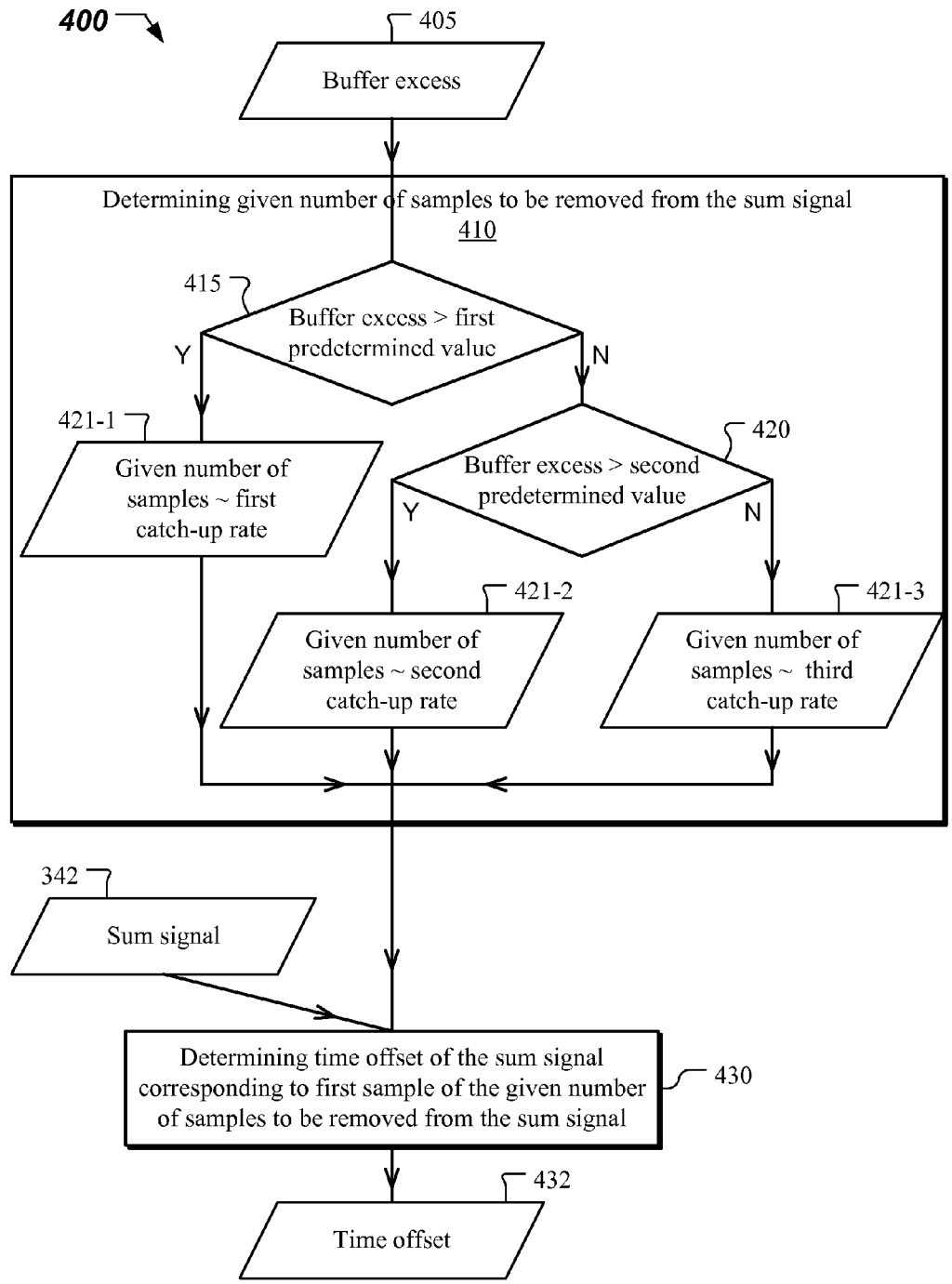
FIG. 4A is an example of analysis in time domain for down-sampling a combined signal.

FIG. 4A shows an example of analysis in time domain 400 of a combined signal for determining parameters used to down-sample the combined signal. The analysis in time domain 400 uses as inputs a buffer excess 405 and a combined signal 342. In the example illustrated in FIG. 1, the media player 110 is configured to perform the analysis in time domain 400 when the live buffer 120 is in state S1, i.e., only for positive values of the buffer excess 405. In fact, the media player 110 is configured not to perform the analysis in time domain 400 when the live buffer 120 is in state S0, characterized by negative values of the buffer excess 405. The analysis in time domain 400 outputs a given number of samples 421 to be removed or spliced from the combined signal 342. Another output of the analysis in time domain 400 is a time offset 432 of the combined signal 342 corresponding to a first sample among the given number of samples 421 to be removed from the combined signal 342.

In the example illustrated in FIG. 1, a catch-up process can be run when the live buffer 120 is in the state S1 corresponding to a buffer length 130' larger than a maximum acceptable buffer size 126, i.e., for positive values of the buffer excess 405. The catch-up process can include playing back media corresponding to decoded messages of the buffered media stream using a playback acceleration (catch-up rate) that is proportional to the buffer excess 405. For example, a combined signal corresponding to the audio channels of one decoded message can have N=1024 samples. By removing, or splicing, a given number of samples 421 from the combined signal, e.g., k=64 samples, the down-sampled combined signal and the corresponding down-sampled audio channels are left with a reduced number of samples, e.g., N−k=960 samples. Thus, the media content corresponding to the down-sampled audio channels can be played by the media player 110 based on modified timing (N-k samples/channel.) Such modified timing is k/N % faster than the timing of the decoded but unmodified buffered media (N samples.) For example, a playback catch-up rate of k/N % (=64/1024=6.25%) can be obtained by removing or splicing 64 samples from the combined signal 342 that has N=1024 samples.

Accordingly, the analysis in time domain 400 includes determining 410 the given number of samples 421 to be removed from the combined signal 342. The media player can be configured to compare the buffer excess 405 with a first predetermined value. In the example illustrated in FIG. 1, the first predetermined value can be equal to twice the difference between the specified maximum buffer size 126 and the specified buffer size 124, i.e., the first predetermined value represents twice the specified (acceptable) range of buffer overrun. When the buffer excess 405 is larger than the first predetermined value at 415, the given number of samples 421-1 to be removed from the combined signal 342 is determined to correspond to a first predetermined catch-up rate of the accelerated playback described in connection with FIG. 1. For example, to obtain a first predetermined catch-up rate of 6.25% (or 64/1024), the given number of samples 421-1 to be removed from a combined signal having 1024 samples is determined to be 64.

When the buffer excess 405 is smaller than or equal to the first predetermined value at 415, the media player can be configured to compare the buffer excess 405 with a second predetermined value. In the example illustrated in FIG. 1, the second predetermined value can be equal to the difference between the specified maximum buffer size 126 and the specified buffer size 124, i.e., the second predetermined value represents the specified (acceptable) range of buffer overrun.

When the buffer excess 405 is larger than the second predetermined value at 420, the given number of samples 421-2 to be removed from the combined signal is determined to correspond to a second predetermined catch-up rate of the accelerated playback described in connection with FIG. 1. For example, to obtain a second predetermined catch-up rate of 3.13% (or 32/1024), the given number of samples 421-2 to be removed from a combined signal having 1024 samples is determined to be 32.

However, when the buffer excess 405 is smaller than or equal to the second predetermined value at 420, the given number of samples 421-3 to be removed from the combined signal is determined to correspond to a third predetermined catch-up rate of the accelerated playback described in connection with FIG. 1. For example, to obtain a third predetermined catch-up rate of 1.56% (or 16/1024), the given number of samples 421-3 to be removed from a combined signal having 1024 samples is determined to be 16.

Upon reaching this point of the analysis in time domain 400, the media player has adaptively obtained a catch-up rate of the accelerated playback by determining 410 the given number of samples 421 to be removed from the combined signal 342. The media player can use the remaining portion of the analysis in time domain 400 to determine 430 a time offset 432 of the combined signal 342 corresponding to a first sample among the given number of samples 421 to be removed from the combined signal 342. Down-sampling a combined signal by time domain splicing leaves unchanged a pitch of the sound corresponding to the combined signal and can be less computationally complex than frequency-domain down-sampling.

Figure 4B:
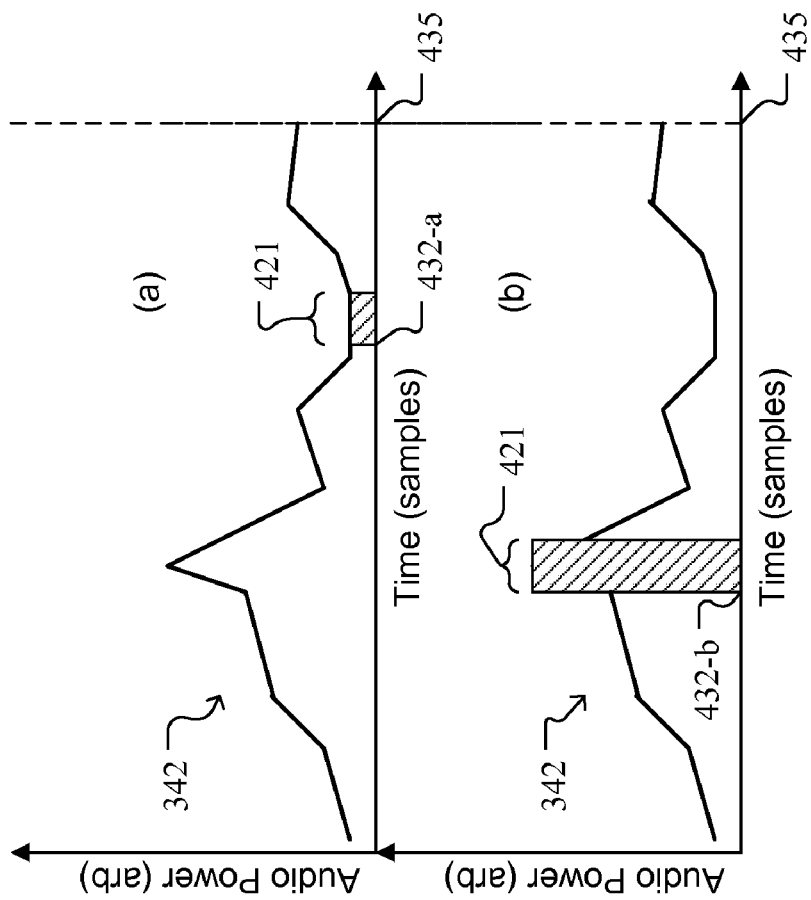
FIG. 4B shows aspects of the time domain analysis of the combined signal.

FIG. 4B shows examples of algorithms for finding the offset 432 of a combined signal 342 to reduce/smoothen an audible change caused by splicing in time-domain a given number of samples 421 from the combined signal 342. Each of panels (a) and (b) of FIG. 4B includes a time axis 435 corresponding to the samples of the combined signal 342. The combined signal 342 begins at the left-end of the time axis 435 with a first sample corresponding to a time offset $t_1=0$. The combined signal 342 ends at the right-end of the time axis 435 with a last sample corresponding to $t_N=1024$, for instance. The audio power axis (in arbitrary units) shows a relative power difference between the samples of the combined signal 342. Although the combined signal 342 is a digital signal and it is formed of N-discrete samples, panels (a) and (b) illustrate the combined signal 342 as a continuous line representing an envelope of the samples included in the combined signal 342. The given number of samples 421 to be removed from the combined signal 342 is represented by a back-slash box. The time offset 432 determined in this manner corresponds to a first sample among the given number of samples 421 to be removed from the combined signal 342, i.e., to the leading edge of the back-slash box.

In some implementations, the given number of samples 421 can be removed from a region of the combined signal 342 selected based on the sound intensity of the selected region of combined signal 342. A first example algorithm, illustrated in panel (a) of FIG. 4B, is configured to remove the given number of samples 421 from a first region of the combined signal 342 corresponding to the lowest audio power, starting with the time offset 432-a. A second example algorithm, illustrated in panel (b) of FIG. 4B, is configured to remove the given number of samples 421 from a second region of the combined signal 342 having maximum audio power, starting with the time offset 432-b.

The given number of samples 421 and the time offset 432 determined in accordance with the analysis in time domain 400 can be used for generating down-sampled combined signals 342 and down-sampled difference signals 347 as described below.

Figure 5:
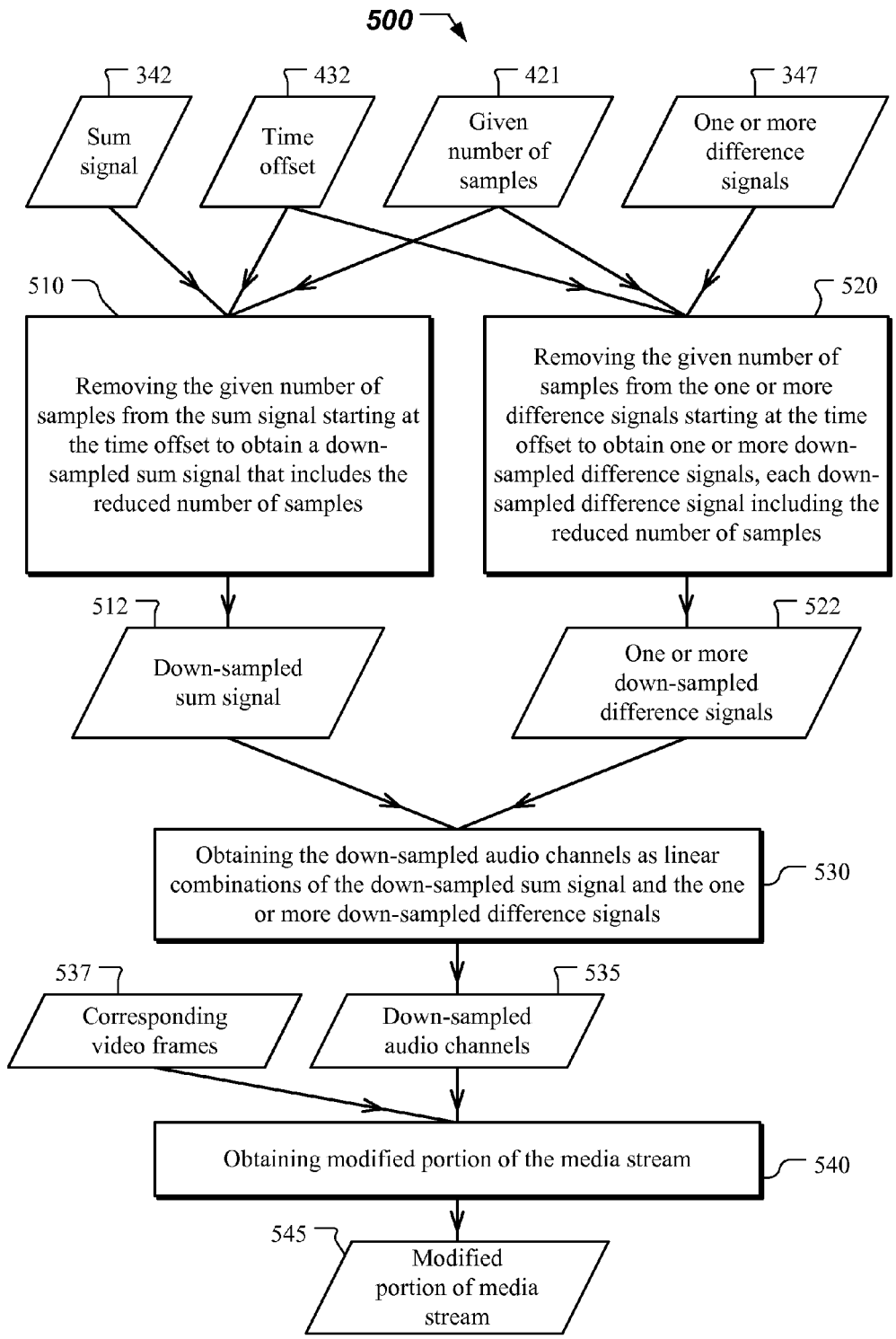
FIG. 5 is an example of a method for down-sampling combined signals and for generating a modified media stream based on the down-sampled combined signals.

FIG. 5 is an example of a method 500 for down-sampling combined signals and for generating a modified media stream based on down-sampled combined signals. In the example illustrated in FIG. 1, the method 500 can be performed by a data processing apparatus 105 and can be implemented as part of the media player 110. Moreover, method 500 can be used in conjunction with methods 200 and 300 for down-sampling a sum signal 342 and one or more difference signals 347, based on the given number of samples 421 and the time offset 432 that are adaptively determined in accordance with the analysis 400.

As described above in connection with FIGS. 4A-4B, the splicing parameters including the given number of samples 421 and the time offset 432 are determined on the sum signal 342 such that any potential distortion can be evenly distributed between all audio channels. Additionally, the down-sampled audio channels can remain in synch since splicing is driven by the sum channel.

Method 500 includes removing 510 the given number of samples 421 from the sum signal 342 starting at the determined time offset 432 to obtain a down-sampled sum signal 512 that includes a reduced number of samples. Method 500 also includes removing 520 the same given number of samples 421 from each of the one or more difference signals 347 starting at the same determined time offset 432 to obtain respective one or more down-sampled difference signals 522 such that each down-sampled difference signal includes the reduced number of samples.

For example, a sum signal 432 and one or more difference signals 347 corresponding to the audio channels of one decoded message can have N=1024 samples. By removing 510, 520 the given number of samples 421 from the sum signal 432 and from the one or more difference signals 347, e.g., k=64 samples, the down-sampled sum signal 512 and the down-sampled one or more difference signals 522 are left with a reduced number of samples, e.g., N−k=960 samples.

In some implementations, the splicing 510, 520 aspects of method 500 can be followed by local filtering such that a gap opened in the sum signal (and/or in the one or more difference signals) by the removal of the given number of samples 421 can be smoothen.

The method 500 further includes obtaining 530 the down-sampled audio channels 535 by using linear combinations of the down-sampled sum signal 512 and of the one or more down-sampled difference signals 522. For example, after splicing 510, 520 (and optionally filtering) a sum signal 512 and a difference signal 522, the left and right channels 535 of a stereo audio arrangement can be reconstructed as l[i]=t(s[i]+d[i]), and r[i]=t(s[i]−d[i]). The function "t" represents a truncation function for 16-bit signed integers, defined as t(x)=32767 if x>32767, t(x)=−32767 if x<−32767, and t(x)=x, otherwise.

Furthermore, the method 500 includes obtaining 540 a modified portion of the media stream 545 from the timed-sequence of video frames 537 corresponding to the decoded portion of the received media stream and the obtained down-sampled audio channels 535. As described above in connection with FIG. 2, the media player can play the reduced number of audio samples of the down-sampled audio channels 535 faster than it would play an un-spliced version of the audio channels. Additionally, since the media player is configured to synchronize video to audio, synchronization of the down-sampled audio channels 535 and of the video frames 537 can be maintained during catch-up play/consumption of the modified portion of the media stream 545.

As described in the example illustrated in FIG. 1, presentation 115 of a live concert by the media player 110 receiving a media stream from a media streaming server system is expected to be a high quality audio and visual experience for an audience member associated with the media player 110. Accordingly, when the live buffer 120 is in state S1, the media player 110 is configured to perform method 200 (along with methods 300, 500 and with the analysis 400) in an iterative manner until the buffer excess corresponding to the state S1 is eliminated and the live buffer 120 transitions back into state S0.

The systems and techniques described in this specification can be applied to situations described in connection with FIG. 1 when the media stream data is added to the live buffer 120 faster than the media player 110 can consume the buffered media. If the media stream data is added to the live buffer 120 slower than it can be consumed causing live buffer 120 underflow conditions, the media player 110 can be configured to trigger re-buffering. Upon re-buffering completion, the media player 110 can start playing media 115. When the live buffer 120 underflows due to temporary network congestion or media steaming server overload, the media player 110 can be configured to stop playback of media content 115, since it is unknown when media messages will arrive again at the client system 105. However, when the live buffer 120 underflows in a predictable manner (e.g., due to clock skew between sender and receiver 105,) the media player 110 can be configured to slow-down (stretch) playback of media content by interpolating portions of decoded media.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:

receiving a media stream in a buffer, the received media stream including media messages, each media message comprising (i) a timed-sequence of video frames and (ii) audio channels that are synchronized with the timed-sequence of video frames, each audio channel including a number of channel-specific samples that are separated in time within each channel and are synchronized across the audio channels;

decoding a media message from the buffer to obtain a decoded portion of the received media stream including a corresponding timed sequence of video frames and corresponding audio channels;

responsive to a size of the buffer being less than or equal to a predetermined size, playing the decoded portion of the received media stream;

responsive to the size of the buffer being more than the predetermined size, summing the audio channels corresponding to the decoded portion of the received media stream in a sum signal having the number of samples of the audio channels, analyzing in time domain the sum signal to determine a reduced number of samples to obtain down-sampled audio channels corresponding to the respective audio channels, each down-sampled audio channel to include the reduced number of samples, wherein said analyzing in the time domain comprises determining a time offset of the sum signal and a given number of samples to be removed from the sum signal starting at the determined time offset, generating based on the analyzing a modified portion of the media stream that includes the timed-sequence of video frames corresponding to the decoded portion of the received media stream and the down-sampled audio channels, and playing the modified portion of the media stream;

while playing the decoded portion of the received media stream or the modified media stream, decoding a next media message from the buffer to obtain a decoded next portion of the received media stream; and processing the decoded next portion of the received media stream responsive to the size of the buffer relative to the predetermined size.

2. The method of claim 1, wherein said summing the audio channels corresponding to the decoded portion of the received media stream into the sum signal comprises performing a weighted sum of the audio channels.

3. The method of claim 1, wherein said determining the given number of samples to be removed from the sum signal starting at the determined time offset comprises:

selecting the given number of samples to be removed based on a difference between the size of the buffer and the predetermined size.

4. The method of claim 1, further comprising:
combining the audio channels corresponding to the decoded portion of the received media stream in one or more difference signals that comprise corresponding difference samples, each of the one or more difference signals having the number of samples of the audio channels,
wherein said generating based on the analyzing comprises,
removing the given number of samples from the sum signal to obtain a down-sampled sum signal that comprises the reduced number of samples,
removing the given number of samples from each of the one or more difference signals starting at the determined time offset to obtain respective one or more down-sampled difference signals such that each down-sampled difference signal comprises the reduced number of samples, and
obtaining the down-sampled audio channels using linear combinations of the down-sampled sum signal and the one or more down-sampled difference signals.

5. The method of claim 4, wherein the one or more differences signals represent pair-wise differences of audio channels.

6. The method of claim 1, wherein the audio channels include a left audio channel and a right audio channel corresponding to a stereo sound mix.

7. The method of claim 1, wherein the audio channels include six audio channels corresponding to a 5.1 sound mix.

8. A system comprising:
memory configured to store a live buffer; and
one or more processors communicatively coupled with the memory and configured to perform operations including:
receiving a media stream in the live buffer, the received media stream including media messages, each media message comprising (i) a timed-sequence of video frames and (ii) audio channels that are synchronized with the timed-sequence of video frames, each audio channel including a number of channel-specific samples that are separated in time within each channel and are synchronized across the audio channels;
decoding a media message from the live buffer to obtain a decoded portion of the received media stream including a corresponding timed sequence of video frames and corresponding audio channels;
responsive to a buffer length of the live buffer being less than or equal to a predetermined length, playing the decoded portion of the received media stream;
responsive to the buffer length being more than the predetermined length,
summing the audio channels corresponding to the decoded portion of the received media stream in a sum signal having the number of samples of the audio channels,
analyzing in time domain the sum signal to determine a reduced number of samples to obtain down-sampled audio channels corresponding to the respective audio channels, each down-sampled audio channel to include the reduced number of samples, wherein the operation of analyzing in the time domain comprises determining a time offset of the sum signal and a given number of samples to be removed from the sum signal starting at the determined time offset,
generating based on the analyzing a modified portion of the media stream that includes the timed-sequence of video frames corresponding to the decoded portion of the received media stream and the down-sampled audio channels, and
playing the modified portion of the media stream;
while playing the decoded portion of the received media stream or the modified media stream, decoding a next media message from the buffer to obtain a decoded next portion of the received media stream; and
processing the decoded next portion of the received media stream responsive to the length of the buffer relative to the predetermined length.

9. The system of claim 8, wherein to carry out said summing the audio channels corresponding to the decoded portion of the received media stream into the sum signal, the one or more processors are configured to perform operations comprising performing a weighted sum of the audio channels.

10. The system of claim 8, wherein the one or more processors are configured to perform operations comprising:
combining the audio channels corresponding to the decoded portion of the received media stream in one or more difference signals that comprise corresponding difference samples, each of the one or more difference signals having the number of samples of the audio channels,
wherein to carry out said generating based on the analyzing comprises, the one or more processors are configured to perform operations comprising:
removing the given number of samples from the sum signal to obtain a down-sampled sum signal that comprises the reduced number of samples,
removing the given number of samples from each of the one or more difference signals starting at the determined time offset to obtain respective one or more down-sampled difference signals such that each down-sampled difference signal comprises the reduced number of samples, and
obtaining the down-sampled audio channels using linear combinations of the down-sampled sum signal and the one or more down-sampled difference signals.

11. The system of claim 10, wherein the one or more difference signals represent pair-wise differences of audio channels.

12. The system of claim 8, wherein the audio channels include a left audio channel and a right audio channel corresponding to a stereo sound mix.

13. The system of claim 8, wherein the audio channels include six audio channels corresponding to a 5.1 sound mix.

14. A computer storage medium encoded with a computer program, the program comprising instructions that when executed by data processing apparatus cause the data processing apparatus to perform operations comprising:
receiving a video stream in a buffer, the received video stream including messages, each video message comprising (i) a timed-sequence of video frames and (ii) audio channels that are synchronized with the timed-sequence of video frames, each audio channel including a number of channel-specific samples that are separated in time within each channel and are synchronized across the audio channels;
decoding a video message from the buffer to obtain a decoded portion of the received video stream including a corresponding timed sequence of video frames and corresponding audio channels;

responsive to a length of the buffer being less than or equal to a predetermined length, playing the decoded portion of the received video stream;

responsive to the length of the buffer being more than the predetermined length, mixing the audio channels corresponding to the decoded portion of the received video stream in a sum signal having the number of samples of the audio channels, analyzing in time domain the sum signal to determine a reduced number of samples to obtain down-sampled audio channels corresponding to the respective audio channels, each down-sampled audio channel to include the reduced number of samples, wherein said analyzing in the time domain comprises determining a time offset of the sum signal and a given number of samples to be removed from the sum signal starting at the determined time offset generating based on the analyzing a modified portion of the video stream that includes the timed-sequence of video frames corresponding to the decoded portion of the received video stream and the down-sampled audio channels, and playing the modified portion of the video stream;

while playing the decoded portion of the received video stream or the modified video stream, decoding a next video message from the buffer to obtain a decoded next portion of the received video stream; and processing the decoded next portion of the received video stream responsive to the length of the buffer relative to the predetermined length.

15. The computer storage medium of claim 14, wherein said mixing the audio channels corresponding to the decoded portion of the received video stream into the sum signal comprises performing a weighted sum of the audio channels.

16. The computer storage medium of claim 14, further comprising:

combining the audio channels corresponding to the decoded portion of the received video stream in one or more difference signals that comprise corresponding difference samples, each of the one or more difference signals having the number of samples of the audio channels, wherein said generating based on the analyzing comprises, removing the given number of samples from the sum signal to obtain a down-sampled sum signal that comprises the reduced number of samples, removing the given number of samples from each of the one or more difference signals starting at the determined time offset to obtain respective one or more down-sampled difference signals such that each down-sampled difference signal comprises the reduced number of samples, and obtaining the down-sampled audio channels using linear combinations of the down-sampled sum signal and the one or more down-sampled difference signals.

17. The computer storage medium of claim 16, wherein the one or more differences signals represent pair-wise differences of audio channels.

18. The computer storage medium of claim 14, wherein the audio channels include a left audio channel and a right audio channel corresponding to a stereo sound mix.

19. The computer storage medium of claim 14, wherein the audio channels include six audio channels corresponding to a 5.1 sound mix.

* * * * *